United States Patent Office 3,090,705
Patented May 21, 1963

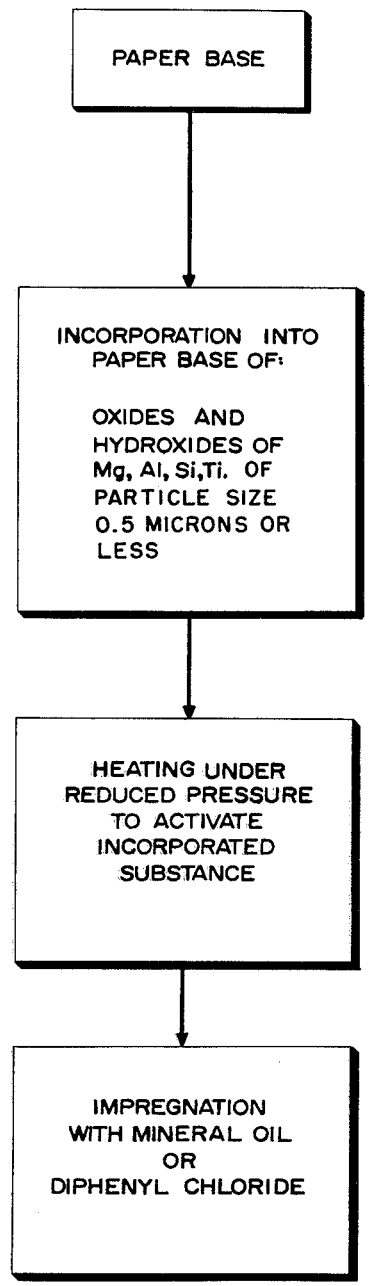

3,090,705
IMPREGNATED PAPER TO SERVE AS A DIELECTRIC, ESPECIALLY IN CONDENSERS TO IMPROVE THEIR CRITICAL PERFORMANCE
Reinhold Miksits, Laxa, Sweden, assignor to Tervakoski Osakeyhtiö, Tervakoski, Finland
Filed Jan. 15, 1959, Ser. No. 787,052
Claims priority, application Germany Jan. 17, 1958
7 Claims. (Cl. 117—154)

The present invention relates to an impregnated paper to serve as a dielectric, especially in condensers to improve their critical performance.

The dielectric losses which arise in A.C. operated condensers greater heat and raise the temperature of the condenser. This rise in temperature continues because, once a certain minimum has been exceeded, dielectric losses rise at an increasing rate as the temperature goes up. For the satisfactory operation of a condenser the generated heat must therefore be removed to maintain a state of equilibrium between the generated and the dissipated heat. If insufficient heat is dissipated, the temperature of the condenser rises, its electrical strength deteriorates and pyro-electric breakdown results. Since the dissipation of heat also depends upon the temperature gradient between the condenser and the ambient, these considerations are of particular importance in condensers used in tropical climates, in condensers incorporated in service apparatus, and generally wherever the external temperatures are likely to be above the average (cf. F. Liebscher, Elektrizitätswirtschaft, April 1957).

The limiting performance up to which the heating of a condenser will not cause a temperature build up that will lead to break-down is its critical performance. The critical performance of a condenser is determined by the characteristic behavior of its power factor (power factor=tan $\delta$) as a function of temperature. These characteristic curves usually exhibit a minimum in the region between 40 and 60° C. and they then rise more or less steeply as the temperature rises.

The critical performance can therefore be improved by reducing the losses in the working temperature range, by displacing the loss minimum into the region of higher temperatures, and especially by reducing to the utmost the losses with rising temperature in the higher temperature region, such as between 60 and 120° C. (cf. the literature as above). The aim of the invention which consists in improving the critical performance is therefore tantamount to improving the characteristic power factor/temperature curve. In detail the present invention therefore seeks to reduce losses in the working temperature range, to displace the minimum losses into the region of higher temperatures and principally to reduce the losses in the region between about 60 and 120° C., flattening the characteristic curve in this temperature region, this being a matter of importance in order to improve the critical performance.

Substantially the invention consists in the provision of an impregnated paper to serve as a dielectric, especially as a dielectric in condensers, which will reduce the dielectric losses in the temperature region between about 60 and 120° C., which is characterized in that it is provided with finely divided active substances, such as metal hydroxides, hydrated metal oxides, or metal oxides (silicon dioxide, titanium dioxide, silicic acid, titanic acid), which have a large surface and predominantly colloidal particle sizes averaging $0.5\mu$ or less, and which act upon the loss-causing impurities in the impregnant by binding them and thus removing them from the impregnant when the previously heat and/or vacuum treated paper is impregnated, with the result of reducing the energy loss in the dielectric.

The substance of the invention is therefore constituted in the fact that substances with which the paper is provided initiate a process when the paper is impregnated and the substances make contact with the impregnant, said process causing a qualitative change in the impregnant and in the dielectric. This process comprises two aspects. On the one hand, the loss-increasing impurities are extracted from the impregnant (a result which per se would merely be tantamount to changing their spatial location) and, on the other hand, as an essential further feature, the impurities are bound by the active substances in such a way as to destroy their loss-increasing effect or at least to limit it substantially. This qualitative change brings about a reduction in the dielectric loss and, as measurements performed with papers impregnated according to the invention have revealed, this reduction is particularly apparent in the temperature region between 60 and 120° C. In other words, the power factor/temperature characteristic experiences an improvement in the direction required for raising the critical performance.

It is a remarkable fact that the described effect will still arise if the impregnant has undergone a special preliminary treatment with adsorbents and/or in a vacuum before it is used for impregnation.

The heat or vacuum treatment which precedes impregnation removes residual moisture or other impurities, such as acid residues due to the active substances. The active substances are also activated and their effect improved. Activation converts, for instance, titanic acid more or less completely into titanium dioxide. In this connection it may be mentioned that the activation of the active substances may call for a more intensive treatment, i.e. a treatment of longer duration, the application of higher temperatures, or of a higher vacuum than is otherwise conventional when drying paper without such substances before it is impregnated. By measuring the power factor during activation the prevailing conditions can be easily controlled and clarified.

Without restriction of the invention to a definite reaction mechanism adsorption phenomena probably play a part in the process. This is borne out by the large superficial area the active substances must have, achieved by the extreme smallness of their particle size. Consequently the active substances may also be employed in the form of agglomerates, i.e. in the form of loosely connected elementary particles. In such a case the specified particle size relates to the size of the elementary particles.

The drawing illustrates the flowsheet of the process of this invention.

The described process begins as soon as the impregnant penetrates into the paper and makes contact therein with the active substances. This process can be experimentally observed if during impregnation and immediately afterwards the power factor it determined by measurement. It is advisable to use a low voltage for performing such measurements, for instance a few volts only. At first, very high power factors will be observed, but these fall rapidly at first and then at a slower rate. The duration of the process varies considerably and depends upon the nature of the active substance, its quantity and subdivision, as well as upon the nature of the impregnant and the specific gravity of the paper. By way of example it may be mentioned that the power factor in the case of small trial condensers quickly dropped during the first 30 minutes, but varied very little in the course of the next few hours. Condensers which, for instance on account of their size, require much longer periods of impregnation naturally also need longer times before the power factor reaches its lowest values.

Provided they have the necessary small particle size and an appropriate purity for instance the following substances are suitable as active substances: chemically produced metal hydroxides, hydrated metal oxides of silicon, aluminium, or titanium and the oxides produced therefrom as well as natural substances, such as bentonite, kaolinite, clay, or other aluminium silicates, both untreated as well as in dehydrated condition. Purified diatomaceous earth may likewise be used, as well as mixtures of the afore-mentioned substances.

Apart from the nature of the basic reagent, the efficacy of the treatment depends principally upon fineness, i.e. particle size, and the resultant surface activity. The finer the grain of the active substances, the more effective will they be, and the more suitable for application to very thin condenser papers as used more particularly for condensers intended to have a high capacity per unit volume or at relatively low potentials. For papers which are about 0.02 mm. thick, or thinner, it is advisable to use substances which have a mean particle size not exceeding $0.05\mu$. Such active substances will have an effective surface of about 50 sq. m. per gram. They are preferably produced as hydrated metal oxides from the corresponding metal chloride compounds and they may be transformed into the oxides. Other methods are also applicable, especially the type of techniques employed in the production of colloids and sols, provided the resultant preparations are sufficiently pure.

With reference to the required quantities of active substance it may be mentioned for instance that when employing titanium hydrate precipitated by a special technique in ultra fine division of the paper fibres in quantities, calculated as titanium dioxide, on only about 0.5% of the weight of the paper, an effective improvement of the characteristic power factor/temperature curve was obtained both when mineral oil and Clophen (diphenyl chloride) had been used as impregnants (see Example 5). If basic substances comprising OH-groups such as hydroxides or hydrated oxides used as active substances, their quantities must not exceed a few weight percent. Since these substances have a higher power factor than paper or the dielectric, their quantitative presence in higher contents may impair the desired effect and even cause an increased loss.

When using larger quantities of active substance, for instance 6 to 8% and more related to the weight of the paper, good results are obtained if metal oxides are employed, principally oxides which have a power factor which is less than that of the cellulose of the paper. Generally these will be substances such as silicon dioxide, kieselguhr, or calcined kaolinite which have permittivities that are approximately equal to that of the dielectric so that a uniform electrical field will arise, as required in highly stressed condensers.

If such metal oxides are produced from the corresponding hydroxides or hydrates by thermal treatment, the following points should be remembered: It is not enough to extend the thermal treatment to temperatures at which the water of hydration is just ejected. The thermal treatment must be such that the oxide will be substantially stabilised to rehydration. For instance at temperatures between 500 and 600° C. kaolinite as well as aluminum hydroxide will be transformed into oxides. But these compounds are still hygroscopic and liable more or less quickly to revert to the initial product. A substantially stable oxide is not obtained unless these substances are heated for several hours at temperatures of about 1000° C. In the case of aluminum oxide it is advisable not to exceed 1100° C. because corundum will then be formed which, by its excellent abrasive properties, quickly attacks the metal components of the mills in the making of the paper, and the abraded metal dust may then appear in the finished product, destroying or at least reducing its insulation properties.

It is a noteworthy fact that when the reagents are present in the stated major quantities their effect upon the impregnant according to the invention is supplemented by a further effect which also contributes to reducing loss, especially the dielectric loss. When measuring the loss angles of unimpregnated and merely activated, i.e., merely thermally and vacuum-treated dielectrics, it was found that by comparison with dielectrics consisting of the same paper without the active substance the power factor of paper prepared according to the invention was noticeably lower by an amount which could not be ascribed solely to the quantitative addition of the active substance.

The reasons underlying this result have not as yet been satisfactorily explained. However, it is probable that the fine-grained active substances form loss-reducing compounds with the terminal groups of the cellulose under the influence of the heat when the paper is dried. The presence of such bonds seems likely since water does not cloud when paper according to the invention is pulped therein.

It need not be specially pointed out that the loss reduction which is already obtained in the unimpregnated paper is retained in the impregnated dielectric and increases the loss reduction due to the action of the active substances on the impregnant.

It is therefore advisable to add the active substances in quantities and in sufficient fineness to bring about an improvement in the properties of the paper prior to its impregnation with a view to further reducing dielectric loss.

The present invention may be further supplemented by the simultaneous application of other known means or measures which in a dielectric consisting of paper and an impregnant improve the dielectric properties especially in the direction of reducing losses in the dielectric.

To obtain very low dielectric loss it is therefore expedient in the production of a paper according to the invention to make use of a cellulose which per se is already a low-loss material. Such a paper can be obtained from a furnish prepared by the sulphate process, especially if this contains a high proportion of alpha-cellulose and is as free as possible from impurities, i.e. if the ash content is less than 0.3%.

It is also advisable to provide the paper with a satin finish. The quantitative proportion of active substance and impregnant can thereby be modified and the paper adapted to special requirements the dielectric may be desired to fulfil.

Paper prepared according to the invention may also be varnished, metallised, or treated in some other way.

Apart from condensers, the dielectric according to the invention may be applied to other purposes such as to the insulation of cables, conductors, coils, and other electrical devices. It may be an advantage if the dielectric according to the invention is used in combination with another dielectric such as a plastic foil.

It is known that the dielectric properties of impregnants can be improved by treating them with natural or activated substances such as bentonite, fuller's earth, or the like. The use of aluminum hydroxide or aluminum oxide has also been proposed for chlorinated hydrocarbons. All these earlier proposals fail to suggest the value of the present invention since these activators, after having taken effect, are again removed from the impregnant, for instance by filtration. Since the impurities extracted from the impregnant are bound by the activator these impurities are removed from the impregnant together with the activator. In the proposal to treat chlorinated hydrocarbons with aluminum hydroxide or aluminum oxide attention is particularly drawn to the necessity of the aluminum oxide being sufficiently coarse to prevent fine oxide particles from entering the insulation material.

In the present invention the active substances and the impurities they bind and extract from the impregnant are required to remain in the dielectric and in the electrical field during operational service. It is an unexpected result adduced by the present invention that the active substances employed in the proposed form with a large surface area and very small particle sizes do not only extract from the impregnant the impurities which cause the losses but that these impurity particles are at the same time bound by the active substances in such a way that they cease to give rise to losses or at least effectively reduce them. Another remarkable fact is that the breakdown strength is by no means impaired and that actually there is a small improvement in this respect by comparison with papers which have no active substances incorporated in them.

The results produced by the present invention are surprising for another reason. As has already been stated the improvement in the characteristic power factor/temperature curve is still maintained if the impregnant, prior to impregnation, is subjected to one of the aforementioned treatments, for instance with activated fuller's earth, aluminum oxide, or the like, or to an additional vacuum treatment. It could not well be anticipated that in the given conditions and to the extent actually experienced an impregnant would still be amenable to a further reduction in loss after having already been submitted to such a loss-diminishing treatment.

Other known proposals relate to loading condenser paper with various materials. The application of titanium oxide in this connection is aimed at increasing the condenser capacity, whereas the use of mica is intended to improve insulation resistance. Apart from the fact that the objects of these proposals are not directed to improving the characteristic power factor/temperature curve, their effect is also exclusively due, on the one hand, to the dielectric properties of the contemplated substances and, on the other hand, to their quantity. The degree of their efficacy is solely quantitatively controlled. They must be regarded as filler materials but not as active substances, as they do not initiate a process which brings about a qualitative change in the dielectric.

Since the intention of these proposals is to utilise the dielectric properties of the materials, they do not suggest applying the substances in colloidal division, as is proposed in the present invention for the specific purpose of activating their adsorptive properties. in the special case of the impregnant being a chlorinated hydrocarbon it has also been proposed to load condenser paper with aluminum hydroxide or aluminum oxide, and in a modification of the same invention it is proposed to add to the chlorinated hydrocarbon which fills the gap between the condenser tube and its case, aluminum hydroxide or aluminum oxide. It is claimed that both methods are equally suitable for stabilising the impregnant during operation. The proposal is based upon the fact that the dielectric losses in the chlorinated hydrocarbons increase while the condenser is in service. This deterioration in service is stated to be compensated by the addition of aluminum hydroxide or aluminum oxide in such manner as to maintain the initial dielectric properties of the condenser for a longer period of time.

The present invention differs from the described proposal in that its object is to improve the dielectric properties in a definite direction ab initio, namely to improve the characteristic power factor/temperature curve in condensers by lowering the power factor particularly in the region between 60 and 120° C. with a view to increasing the critical performance of condensers. The present invention achieves the contemplated improvement in very considerable measure by subjecting the impregnant to the described action of the impurity-binding substances already present in the paper during the impregnation of the paper with the impregnant, i.e. during the production of the condenser and before the latter is actually taken into service.

Furthermore, an aluminum hydroxide or aluminum oxide of a fineness corresponding with 30 to 60 mesh per inch, as has been proposed for the purposes of stabilisation is inapplicable if the objects of the present invention are to be achieved.

In the case of chlorinated impregnants the present invention can also be performed with substances other than aluminum hydroxide or aluminum oxide. Moreover, the present invention further relates to impregnations which make use of mineral oils or other non-chlorinated insulating oils and impregnants.

Further to illustrate the invention the following test results have been compiled, which were obtained by testing condensers formed with dielectrics as proposed by the present invention. For reference purposes simultaneous tests were performed with condensers employing similar dielectrics of like thickness containing no reactive substances. The same paper mass was used for both sets of tests, the paper having been produced by the same procedure, and subjected to the same heat and vacuum treatment, and the same impregnants being used as in the dielectrics prepared according to the invention. The size of the electrode surfaces, i.e. the capacity of the condensers, was likewise approximately equal. The individual wound condenser tubes with dielectrics according to the invention and without reactive substances were jointly compressed in the same press, they were heat and vacuum treated in the same vessel, and then simultaneously impregnated in the same container.

Some of the examples given hereunder relate to dielectrics based on papers produced by conventional methods on paper making machinery. In accordance with the conditions likely to arise in actual practice these condensers were stressed by the application of field strengths of about 10 volts per $\mu$. However, for characterising the special conditions created by the invention, the application of very low field intensities and low test voltages of about 5 to 6 volts for a $100\mu$ dielectric is best, as well as the employment of papers produced under laboratory conditions because the specific gravity of such papers is only about 0.4. The quantitative ratio between impregnant and paper material is then greater than with the usual mechanically produced papers so that the effect of the active substances upon the impregnant is more strikingly demonstrated. A factor of importance is that at very low field intensities the power factor depends considerably upon the state of the impregnant. The power factor in the case of impregnated papers of normal type is very high at low field strengths.

This phenomenon is due to the fact that the ions in the impregnant also have a low velocity when the potential difference and field intensity are low. Their velocity increases as voltage and field strength are raised. The sinusoidal shape of the loss current at low field strength changes when field strength is high and the total energy of the loss current is then lower than when field strengths are low.

In a dielectric material constituted according to the invention the active substances reduce the losses, probably by extracting ions from the impregnant. It is therefore a typical feature of a dielectric according to the invention that measurments at low field intensities adduce not only much lower power factors than in the case of impregnated papers without active substances, but that the differences in the power factors between the two types are then much more impressive than when field strength is high. It is, in other words, a characteristic feature of the invention that in a dielectric provided with active substances the power factor depends less upon field strength than is the case in a similar dielectric without active substances.

The first four examples therefore relate to condensers based on papers produced in known manner in a laboratory. The specific gravity of these papers was about 0.4. Activation was performed in each case by a simultaneous heat and vacuum treatment. In view of the low specific gravity sufficient activation was obtained in a treatment of 12 to 18 hours' duration at a temperature of about 110° C. in a vacuum under 0.1 mm. Hg. The thickness of the papers was over 100μ. The test voltage was 5 to 6 volts and the frequency of the alternating voltage 50 cycles per second.

The power factors in the following examples are given in units which must be multiplied by 10 to the power of minus 4, i.e. a figure of 25 given in the table represents a power factor of 0.0025.

Example 1

The active substance incorporated in the paper was titanic acid. Calculated as titanium dioxide the quantity added represented about 4.3 percent of the weight of the paper. Clophen A 50 (diphenyl chloride) was used as impregnant and treated between 90 and 100° C. for several hours in vacuo. The following power factors were found:

| Temperature, ° C | 60 | 80 | 100 | 120 |
|---|---|---|---|---|
| Condensers without active substance | 45 | 120 | over 250 | |
| Condensers with active substance | 15 | 23 | 42 | 83 |

Example 2

In this test the same active substance was added in the same quantitative dose to the paper pulp. However, the Clophen was more intensely purified than in Example 1. The vacuum and heat treatment was prolonged over at elast 12 to 18 hours and about half way through this treatment 0.5 weight percent of fuller's earth was mixed into the Clophen, the fuller's earth having first been treated in a vacuum oven at 150° C.

The following power factors were found:

| Temperature, ° C | 60 | 80 | 100 | 120 |
|---|---|---|---|---|
| Condensers without active substance | 24 | 60 | 140 | over 250 |
| Condensers with active substance | 11 | 15 | 27 | 59 |

Compared with Example 1 the power factors are all lower due to the more thorough preliminary treatment of the Clophen. In all subsequent tests in which the impregnant was Clophen this was therefore subjected to the same preliminary treatment.

Example 3

The following table gives the results of a test series in which similar papers incorporating different active substances were compared with a similar paper lacking the active substance. The impregnant was activated Clophen A 50. The quantities of active substance are given in percentages of the paper weight including about 0.3% ash constituents in the paper raw material.

The condensers were found to have the following power factors:

| Temperature, ° C | 60 | 80 | 100 | 120 |
|---|---|---|---|---|
| Condensers without active substance | 28 | 50 | 104 | 234 |
| Condensers incorporating as active substance: | | | | |
| Kieselguhr | 21 | 28 | 40 | 68 |
| Magnesium oxide | 26 | 31 | 42 | 70 |
| Kaolin and aluminum oxide | 23 | 25 | 35 | 55 |
| Mineral clay | 21 | 23 | 31 | 50 |
| Kaolinite | 22 | 26 | 37 | 70 |
| Bentonite | 22 | 26 | 36 | 60 |

Example 4

This example represents the results obtained in another test series in which the impregnant was a pretreated mineral oil.

The following power factors were found:

| Temperature, ° C | 40 | 60 | 80 | 100 |
|---|---|---|---|---|
| Condensers without active substance | 23 | 34 | 55 | 115 |
| Condensers incorporating as active substance: | | | | |
| Kaolin, 0.81% | 21 | 22 | 23 | 40 |
| Bentonite, 1.1% | 19 | 19 | 20 | 40 |
| Bentonite and aluminum oxide, 0.81% | 21 | 20 | 21 | 26 |
| Kieselguhr, 6.1% | 16 | 17 | 22 | 40 |
| Mineral Clay, 0.92% | 21 | 24 | 29 | 68 |
| Aluminum oxide, 2.6% | 17 | 18 | 21 | 39 |
| Magnesium oxide, 1.4% | 16 | 16 | 17 | 30 |

The further results hereafter given relate to paper with and without active substance, which had been produced on paper-making machinery and satin finished. The capacity of the Clophen-impregnated paper condensers was about 1 microfarad, and that of the oil-impregnated paper condensers about 0.065 microfarad. The tests were carried out with an alternating voltage of 50 c./s. and a field strength of about 10 volts per μ.

Activation lasted 1 to 2 days and was performed at a temperature of 110 to 120° C. under a vacuum pressure below 0.1 mm. Hg. The condensers were wound with two foils and then pressed flat by the application of a pressure of 3 kg./sq. mm.

Example 5

The papers with and without the active substance had the same gauge of 12μ. Their specific gravities were also about the same at 0.92. In the manufacture of the paper according to the invention titanium hydrate was precipitated on to the paper fibres. Calculated as titanium dioxide the quantity of active substance was 0.5% of the weight of the paper. The ash content of the paper pulp was about 0.3%. The impregnant was pretreated Clophen A 50. The condensers were found to have the following power factors:

| Temperature, ° C | 40 | 60 | 80 | 100 |
|---|---|---|---|---|
| Condensers without active substance | 33 | 34 | 37 | 48 |
| Condensers with active substance | 29 | 26 | 28 | 36 |

The same papers were also impregnated with pretreated mineral oil, the tests resulting in the following power factors:

| Temperature, ° C | 40 | 60 | 80 | 100 |
|---|---|---|---|---|
| Condensers without active substance | 25 | 25 | 30 | 45 |
| Condensers with active substance | 24 | 21 | 22 | 31 |

Example 6

The paper incorporating active substance had a thickness of 12.8μ and a specific gravity of 0.98. The active substance was an aluminum oxide which had been practically stabilised against re-hydration. The average particle size was 0.02μ and the quantity 8% of the weight of the paper. The reference paper without active agent was only 12.2μ thick and its specific gravity 1.02.

Power factors, not impregnated, test voltage 50 volts:

| Temperature, ° C | 60 | 80 | 100 | 120 |
|---|---|---|---|---|
| Condensers without active substance | 15 | 15 | 18 | 28 |
| Condensers with active substance | 14 | 13 | 16 | 21 |

Power factors, impregnated with pretreated Clophen A 50, test voltage 240 volts:

| Temperature, ° C | 60 | 80 | 100 | 120 |
|---|---|---|---|---|
| Condensers without active substance | 27 | 29 | 39 | 62 |
| Condensers with active substance | 24 | 24 | 29 | 39 |

Power factors, impregnated with pretreated mineral oil, test voltage 240 volts:

| Temperature, °C | 40 | 60 | 80 | 100 |
|---|---|---|---|---|
| Condensers without active substance | 20 | 21 | 25 | 32 |
| Condensers with active substance | 18 | 18 | 19 | 25 |

In this test the break-down stresses were measured under increasing D.C. voltages.

The averages obtained in the case of 20 each of oil-impregnated twin-foil condensers were as follows:

Kv./mm.
Condensers without active substance _____ 126
Condensers with active substance _____ 141

*Example 7*

This example gives the results of tests in the case of condensers employing a paper according to the invention with a specially high content of active substance. The quantity of active substance was about 15% of the weight of the paper. As in Example 6 the aluminum oxide used as active substance had a mean particle size of $0.02\mu$. The gauge of the paper was $12.0\mu$ and its specific gravity 1.06. A similar paper without active substance was not produced.

The condensers proved to have the following power factors:

| Temperature, °C | 60 | 80 | 100 | 120 |
|---|---|---|---|---|
| unimpregnated test voltage, 8 volts | 17 | 17 | 18 | 20 |
| impregnated with Clophen A 50 test voltage, 240 volts | 27 | 26 | 28 | 32 |
| Temperature, °C | 40 | 60 | 80 | 100 |
| impregnated with mineral oil test voltage, 240 volts | 23 | 22 | 21 | 23 |

What I claim is:

1. A dielectric paper material having an improved power factor in the temperature range between 60 and 120° C., said material consisting essentially of:
   (a) a paper base;
   (b) an active substance incorporated in said paper and selected from the group consisting of activated hydroxides, oxides and hydrated oxides of magnesium, aluminum, silicon and titanium, bentonite, and silicates of aluminum, which substance presents a large surface area and has predominantly colloidal particle sizes averaging 0.5 micron and less,
   (c) mineral oil as impregnant capable of rendering the paper base dielectric and
   (d) impurities initially contained in said impregnant and capable per se of causing energy loss in said dielectric material, said impurities being bound by said active substance, whereby their loss causing effect is substantially reduced.

2. A paper according to claim 1, characterised in that the particle size of the active substance averages $0.05\mu$ or less.

3. Paper according to claim 1, characterised in that the active substance is bound by the paper fibres.

4. Paper according to claim 1 wherein the active substance is a member selected from the group consisting of kaolinite calcined above 1000° C., bentonite calcined above 1000° C. and aluminum hydroxide calcined at 1000° C.

5. Paper according to claim 1, characterised in that the paper base consisting essentially of a cellulose produced by the sulphate process and having a high alpha-cellulose content with less than 0.3% ash.

6. A dielectric paper material having an improved power factor in the temperature range between 60 and 120° C., said material consisting essentially of:
   (a) a paper base;
   (b) an active substance incorporated in said paper and selected from the group consisting of activated hydroxides, oxides and hydrated oxides of magnesium, aluminum, silicon and titanium, bentonite, and silicates of aluminum, which substance presents a large surface area and has predominantly colloidal particle sizes averaging 0.5 micron and less;
   (c) diphenyl chloride as impregnant capable of rendering the paper base dielectric; and
   (d) impurities initially contained in said impregnant and capable per se of causing energy loss in said dielectric material, said impurities being bound by said active substance, whereby their loss causing effect is substantially reduced.

7. A method of manufacturing dielectric paper material of improved power factor at elevated temperatures, comprising
   (a) incorporating in a paper base a substance selected from the group consisting of activated hydroxides, oxides and hydrated oxides of magnesium, aluminum, silicon and titanium, bentonite, and silicates of aluminum, which substance presents a large surface area and has predominantly colloidal particle sizes averaging 0.5 micron and less;
   (b) heating the resulting charged paper under vacuum sufficiently to activate the substance incorporated therein under (a); and
   (c) impregnating the resulting, activated substance-containing paper with mineral oil containing impurities capable per se of causing energy loss in said dielectric material, which impurities are bound during the impregnating step by said activated substance and thereby substantially reduced in their loss-causing property, thereby obtaining a dielectric paper material the power factor of which is substantially reduced in the temperature range between 60° and 120° C.

References Cited in the file of this patent

UNITED STATES PATENTS

| | | |
|---|---|---|
| 1,857,498 | Clapp | May 10, 1932 |
| 2,391,686 | McLean | Dec. 25, 1945 |
| 2,395,992 | Clark | Mar. 5, 1946 |
| 2,417,924 | Gary | Mar. 25, 1947 |
| 2,418,820 | Coggins et al. | Apr. 15, 1947 |
| 2,463,756 | Egerton | Mar. 8, 1949 |
| 2,782,134 | Musgrave | Feb. 19, 1957 |
| 2,801,938 | Iler | Aug. 6, 1957 |